United States Patent [19]

Morita

[11] Patent Number: 5,216,463

[45] Date of Patent: Jun. 1, 1993

[54] ELECTROPHOTOGRAPHIC PROCESS CONTROL DEVICE USING A NEURAL NETWORK TO CONTROL AN AMOUNT OF EXPOSURE

[75] Inventor: Tetsuya Morita, Yokohama, Japan

[73] Assignee: Ricoh Company, Ltd., Tokyo, Japan

[21] Appl. No.: 870,313

[22] Filed: Apr. 17, 1992

[30] Foreign Application Priority Data

Apr. 19, 1991 [JP] Japan .................................. 3-88653

[51] Int. Cl.⁵ .......................................... G03G 21/00
[52] U.S. Cl. .................................. 355/208; 355/202; 355/210; 395/21; 395/23
[58] Field of Search ............... 355/202, 203, 208, 204, 355/207, 219, 228, 210, 214, 216; 364/131, 136, 525, 571.03; 395/21, 23; 358/406, 443, 448

[56] References Cited

U.S. PATENT DOCUMENTS

| | | | |
|---|---|---|---|
| 4,724,461 | 2/1988 | Rushing | 355/214 |
| 4,837,600 | 6/1989 | Kasai et al. | 355/208 |
| 4,922,293 | 5/1990 | Bando | 364/131 |
| 5,075,725 | 12/1991 | Rushing et al. | 355/208 |
| 5,109,275 | 4/1992 | Naka et al. | 358/406 X |
| 5,111,531 | 5/1992 | Grayson et al. | 395/23 |
| 5,164,837 | 11/1992 | Hirosawa | 395/21 X |

Primary Examiner—A. T. Grimley
Assistant Examiner—William J. Royer
Attorney, Agent, or Firm—Oblon, Spivak, McClelland, Maier & Neustadt

[57] ABSTRACT

An electrophotographic process control device capable of controlling the supply of a toner in such a manner as to stabilize an image against changes in the characteristics of a photoconductive element and in toner density. At the learning stage of a neural network, data from sensors are applied to the input layer of the network while a latent image gamma characteristic indicative of a relation between the amount of exposure and the potential of an image area is used as learning data to be given via the output layer of the network. At a control stage, the data from the sensors are applied to the input layer of the network, as at the learning stage, and the amount of exposure is so controlled as to set up a desired potential in an image area on the basis of a latent image gamma characteristic obtainable from the output layer of the network.

3 Claims, 7 Drawing Sheets

ELECTROPHOTOGRAPHIC PROCESS CONTROL DEVICE USING A NEURAL NETWORK TO CONTROL AN AMOUNT OF EXPOSURE

BACKGROUND OF THE INVENTION

The present invention relates to a copier, printer, facsimile transceiver or similar equipment for copying or printing an image by an electrophotographic process and, more particularly, to an electrophotographic process control device capable of controlling an electrophotographic process on a step basis.

Generally, a photoconductive element, typically in the form of a drum, is used to implement an electrophotographic process and has characteristics relating to charging and exposure which are extremely susceptible to various factors and change in a complicated way, as well known in the art. The factors affecting such characteristics of the drum may generally be classified into three kinds, i.e., long-term deterioration factors including the wear and electrostatic fatigue of the drum, short-term deterioration factors including the fatigue of the drum due to exposure and the duration of suspension, and real-time deterioration factors including temperature variation. An optimal control method over the charge potential and amount of charge of the drum depends on the kind of the deterioration factors. It has been customary, however, to prepare a look-up table listing adequate control values in relation to the outputs of a surface electrometer and photosensors by experiments and to simply control the individual parameters by referencing the look-up table.

The conventional look-up table scheme has various problems left unsolved, as follows. To begin with, a look-up table is not attainable without resorting to a prohibitive amount of experiments. Since the control needs a huge amount of data and, moreover, it is effected without specifying the above-stated factors at all, the conventional control device is not applicable to a broad range and often causes the equipment to run out of control. Further, since the characteristics of various constituent parts of the equipment, e.g., grids and drum change or deteriorate due to the number of copies produced, temperature, humidity, toner concentration, fatigue of a developer, and so forth, a reproduction often suffers from contamination in the background thereof as well as from an irregular density distribution. Moreover, assume electrophotographic equipment of the type causing a charger to discharge in response to a grid voltage and dissipates part of the charge deposited on a photoconductive drum by a laser beam to thereby form a latent image. Then, it is likely that the surface potentials of the drum change due to, for example, the deterioration of the photoconductor thereof and charger, preventing a reproduction from having sufficient image density. Also, residual potentials are apt to rise in a continuous copy mode operation, contaminating the background of reproductions.

SUMMARY OF THE INVENTION

It is therefore an object of the present invention to provide an electrophotographic process control device which performs, when a latent image is to be formed on a photoconductive element, control in such a manner as to insure stable images despite changes in the characteristics of a photoconductor of the drum.

In accordance with the present invention, in an electrophotographic process control device, at a learning stage of a neural network, data from sensors disposed within and in peripheral portions of an electrophotographic process mechanism and including a surface electrometer, a drum ammeter, a drum rotation counter, an exposure duration counter, a copy counter, a temperature sensor and a humidity sensor are applied to the input layer of the neural network. A latent image gamma characteristic indicative of a relation between the amount of exposure and the potential of an image area and which is one of characteristics of a photoconductive drum to be used in an electrophotographic process is used as learning data to be given via the output layer of the neural network. At a control stage, the data from the sensors are applied to the input layer of the neural network in the same manner as at the learning stage, and an amount of exposure is so controlled as to set up a desired potential in an image area on the basis of a latent image gamma characteristic obtained from the output layer.

Also, in accordance with the present invention, in an electrophotographic process control device, at a learning stage of a neural network, data from the above-stated sensors are applied to the input layer of the neural network. A charge characteristic indicative of a relation between the potential of a background and the charge grid potential and which is one of characteristics of a photoconductive drum to be used in an electrophotographic process is used as learning data to be given via the output layer of the neural network. At a control stage, the data from the sensors are applied to the input layer of the neural network in the same manner as at the learning stage, and an amount of exposure is so controlled as to set up a desired potential in an image area on the basis of a charge characteristic obtained from the output layer.

Further, in accordance with the present invention, in an electrophotographic process control device, at a learning stage of a neural network, data from the above-stated sensors are applied to the input layer of the neural network. A latent image gamma characteristic indicative of a relation between the amount of exposure and the potential of an image area and which is one of characteristics of a photoconductive drum to be used in an electrophotographic process and a charge characteristic indicative of a relation between the potential of a background and the charge grid potential and which is another characteristic of the photoconductive drum are used as learning data to be given via the output layer of the neural network. At a control stage, the data from the sensors are applied to the input layer of the neural network in the same manner as at the learning stage, and an amount of exposure is so controlled as to set up a desired potential in an image area on the basis of a latent image gamma characteristic and a charge characteristic obtained from the output layer.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figures 1, 1A:
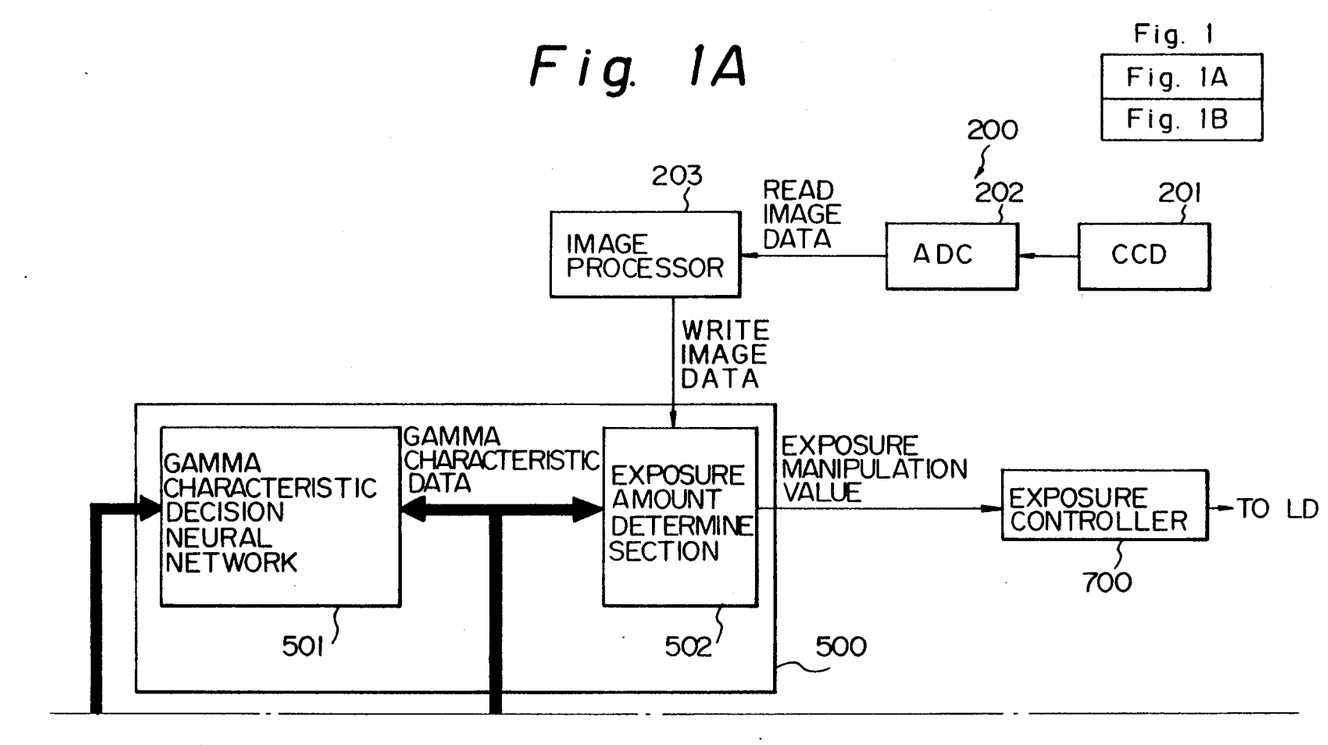
FIGS. 1A and 1B are block diagrams schematically showing a specific configuration in which a neural network included in an electrophotographic process control device embodying the present invention learns.
Figure 1B:
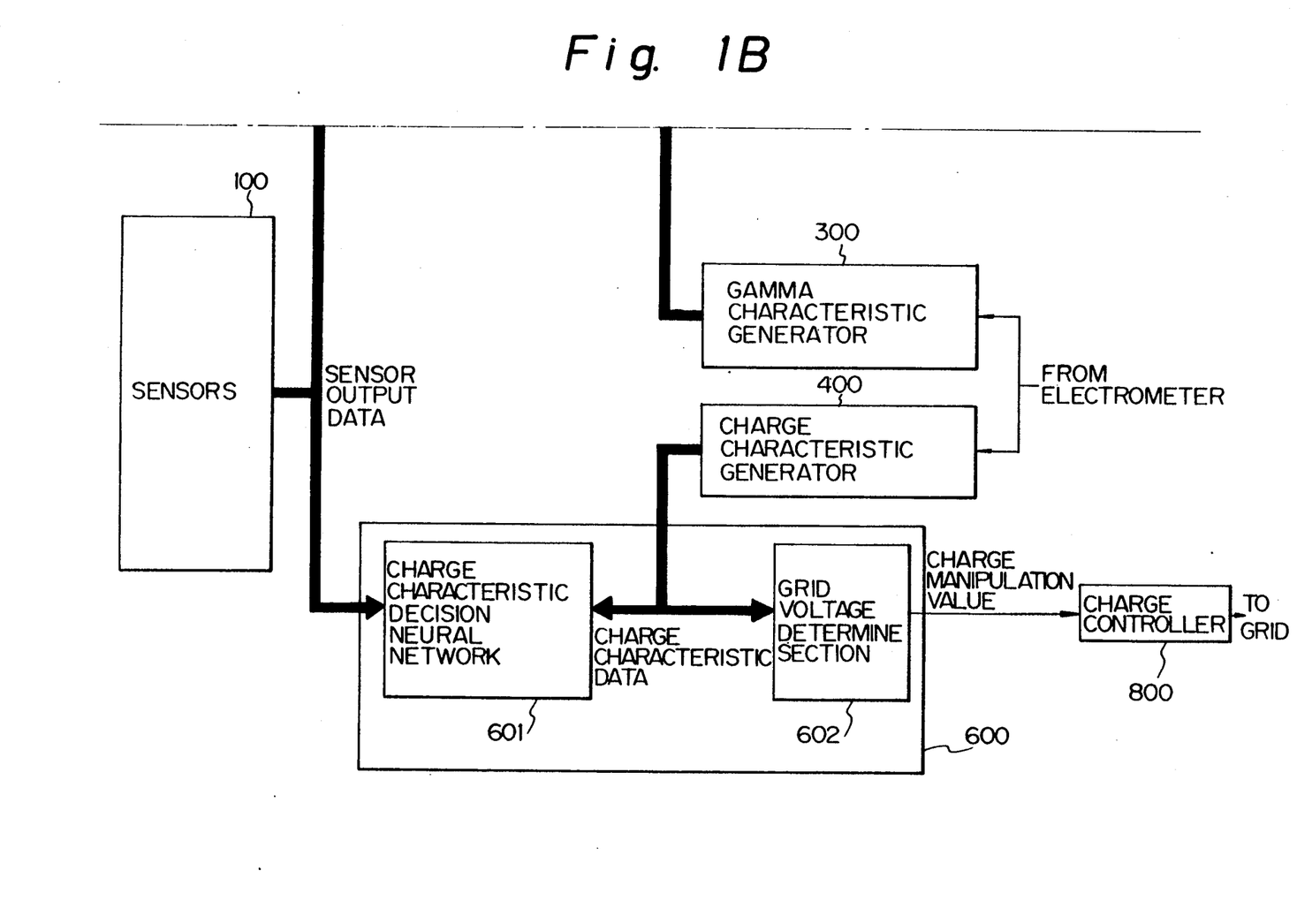

Referring to FIG. 1 of the drawings, there is shown a specific configuration of a neural network incorporated in an electrophotographic process control device embodying the present invention and in a learning stage. As shown, the neural network includes sensors 100 which are disposed in various electrophotographic process units, e.g., in the inside and peripheral portions of a copier. A γ characteristic generator 300 generates the gamma characteristic of a latent image on the basis of the surface potentials of an image area. A charge characteristic generator 400 generates a charge characteristic on the basis of the surface potentials of a white background area. A CCD (Charge Coupled Device) image sensor 201 is included in a scanner 200 and reads a document image while an analog-to-digital converter (ADC) 202 digitizes the read document image. An image processor 203 effects various image processing including correction with the resulting digital image data. An exposure manipulation value determining section 500 determines an exposure manipulation amount meant for an exposure controller 700 in response to the processed image data from the scanner 200 and the sensor output data from the sensors 100. A charge manipulation amount determining section 600 determines a manipulation amount meant for a charge controller 800 in response to the data from the sensors 100. The exposure controller 700 controls the amount of exposure by controlling a laser diode (LD) while the charge controller 800 controls the charge potential via a charger and grid voltage.

The exposure manipulation amount determining section 500 consists of a neural network 501 for outputting latent image gamma characteristic data to be used to determine the gamma characteristic of a latent image, and an exposure determining section 502 for determining an optimal amount of exposure matching the gamma characteristic data. The charge manipulation determining section 600 has a neural network 601 for outputting charge characteristic data to be used to determine a charge characteristic, and a grid voltage determining section 602 for determining an optimal charge manipulation amount matching the charge characteristic.

Figure 2:
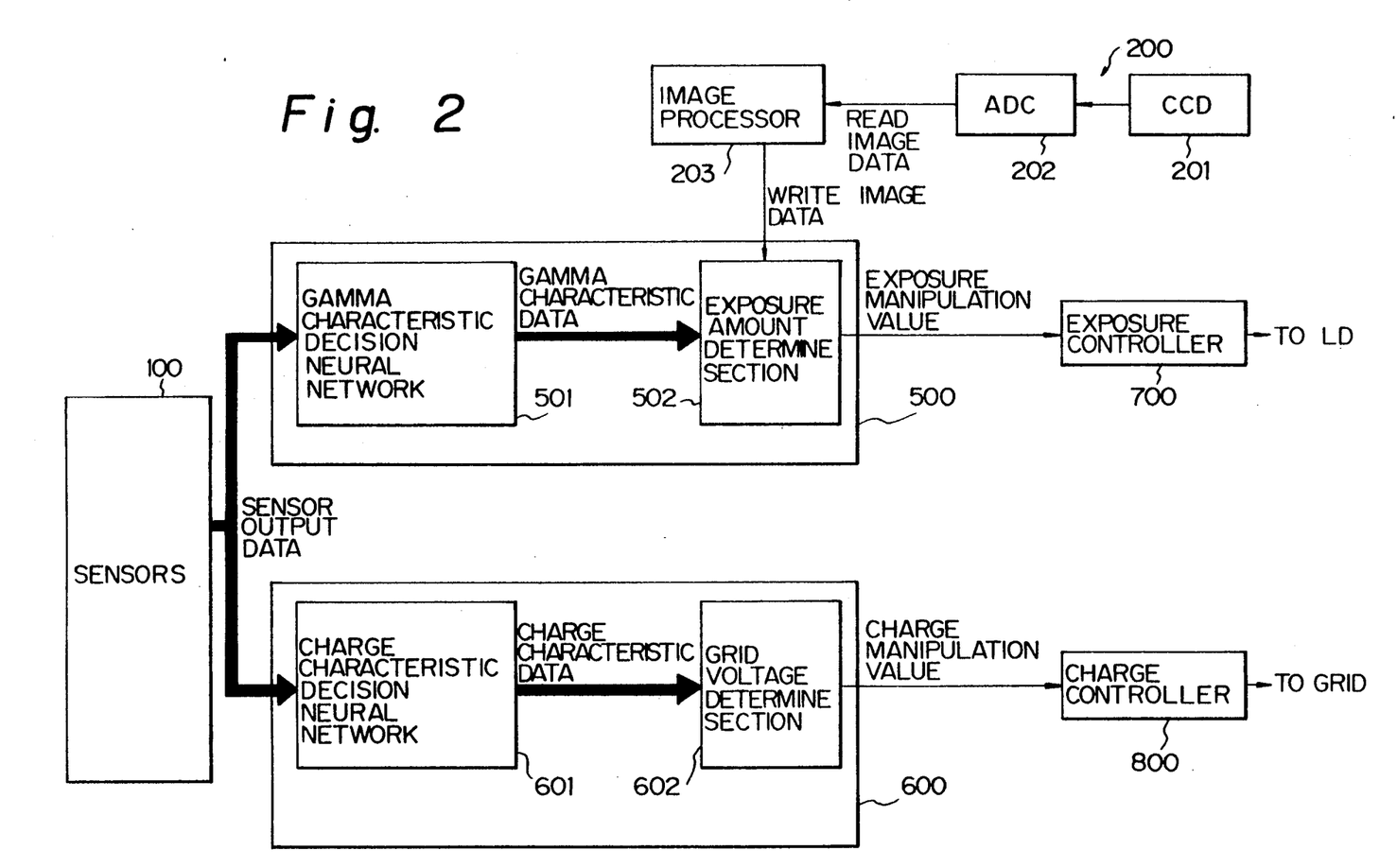
FIG. 2 is a schematic block diagram showing a specific configuration in which the neural network performs decision.

FIG. 2 shows a specific configuration in which the control device actually executes control by use of the above-mentioned neural networks 501 and 601 and by determining a latent image gamma characteristic and a charge characteristic.

Figure 3:
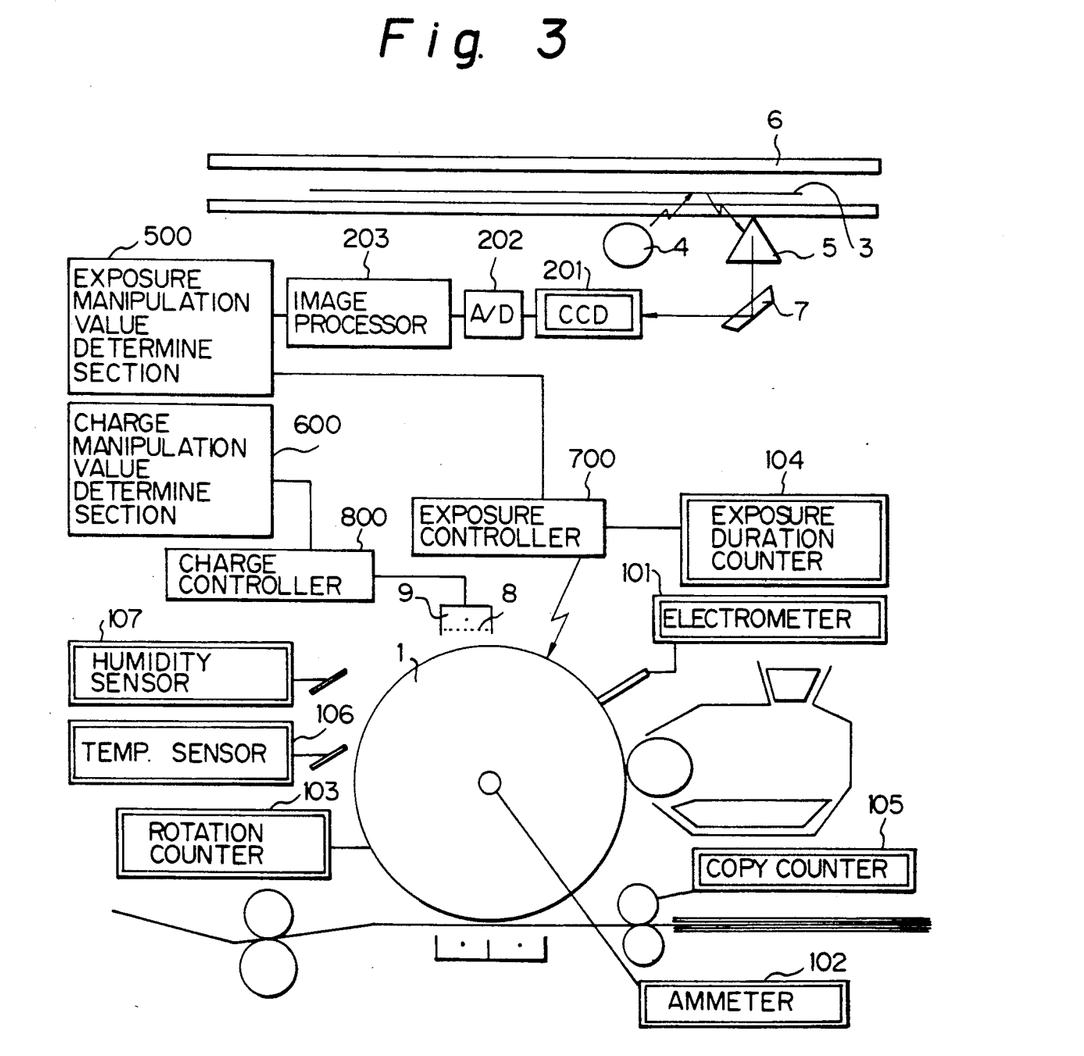
FIG. 3 is a section showing an electrophotographic copier to which the present invention is applicable.

As shown in FIG. 3, the sensors 100 are disposed in the process control device (specifically in the inside and peripheral portions of a copier) and comprised of an electrometer 101 responsive to the surface potential of a photoconductive drum 1, an ammeter 102 responsive to a current flowing through the drum 1, a rotation counter 103 for counting the rotations of the drum 1, an exposure duration counter 104, a copy counter 105, a temperature sensor 106, and a humidity sensor 107.

In FIG. 3, a light source, e.g., a halogen lamp 4 illuminates the image surface of a document 3 existing between a glass platen 5 and a cover plate 6. The resulting reflection from the document 3 is read by the CCD image sensor 201 via optical members including mirrors. The output of the CCD image sensor 201 is digitized by the ADC 202, then processed by the image processor 203, and then applied to the exposure manipulation amount determining section 500. In response, this section 500 determines a manipulation amount meant for the exposing section and sends it to the exposure controller 700. On the other hand, the charge manipulation amount determining section 600 determines a manipulation amount meant for the charging section and sends it to the charge controller 800.

While the charging section of FIG. 3 is shown as having a scorotron type charger 9 having a grid 8 for potential control, it may alternatively be implemented with a corotron type charger without a grid.

Figure 4:
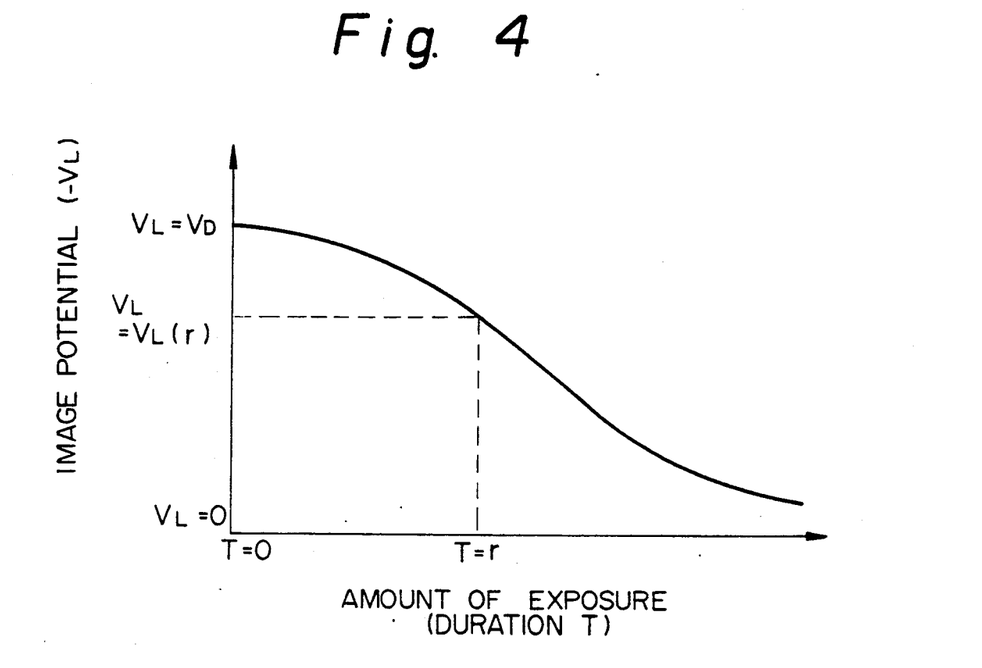
FIG. 4 is a graph indicative of a latent image gamma characteristic particular to the control device of the invention.

FIG. 4 shows a relation between the amount of exposure of the drum 1 and the potential deposited on the drum 1 (image area), i.e., a so-called latent image gamma characteristic. This characteristic is such that when the duration of exposure T is $\tau$, the potential of image area is expressed as $VL = VL(\tau)$.

Figure 5:
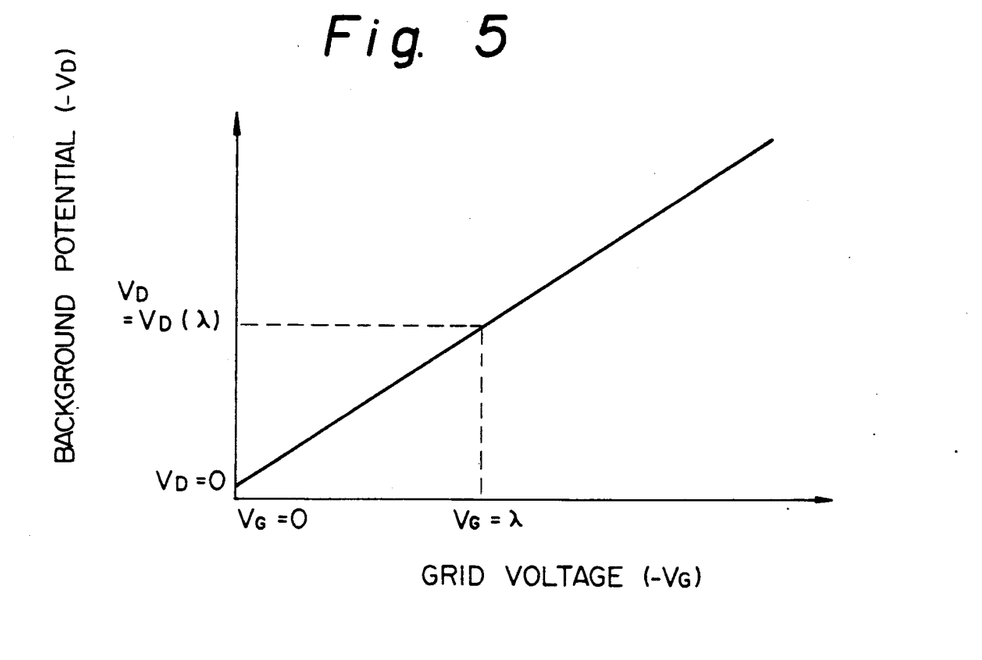
FIG. 5 is a graph indicative of a charge characteristic also particular to the control device of the invention.

FIG. 5 indicates a relation between the grid voltage particular to a scorotron charger and the surface potential of a white background, i.e., a so-called charge characteristic. Specifically, when the grid voltage VG is $\lambda$, the surface potential of a white background is expressed as $VD = VD(\lambda)$. Regarding a corotron charger, the charge characteristic will be the relation between the charge voltage and the surface potential of a white background.

Figure 6:
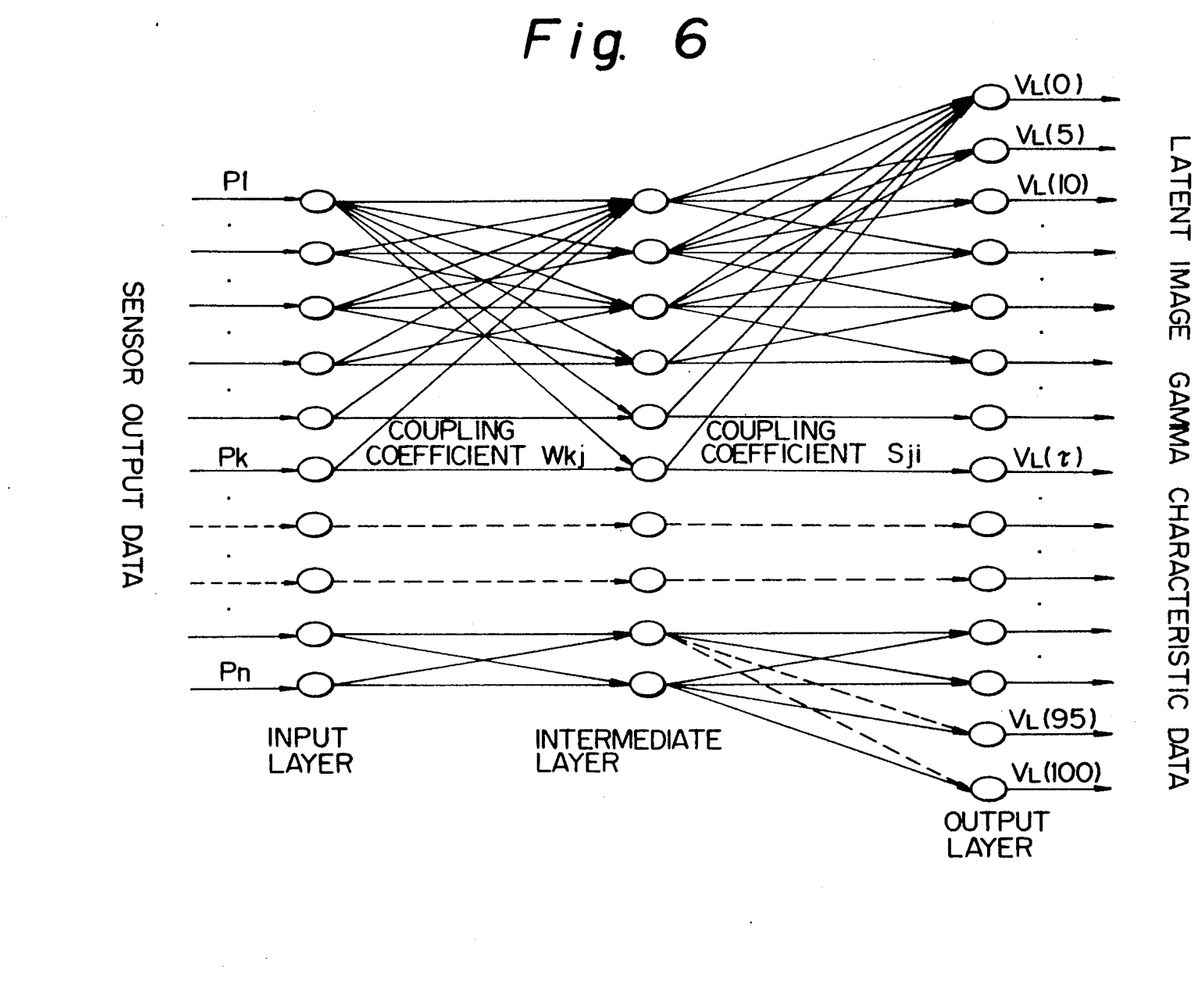
FIG. 6 shows a neural network incorporated in the control device of the invention for determining a latent image gamma characteristic.
Figure 7:
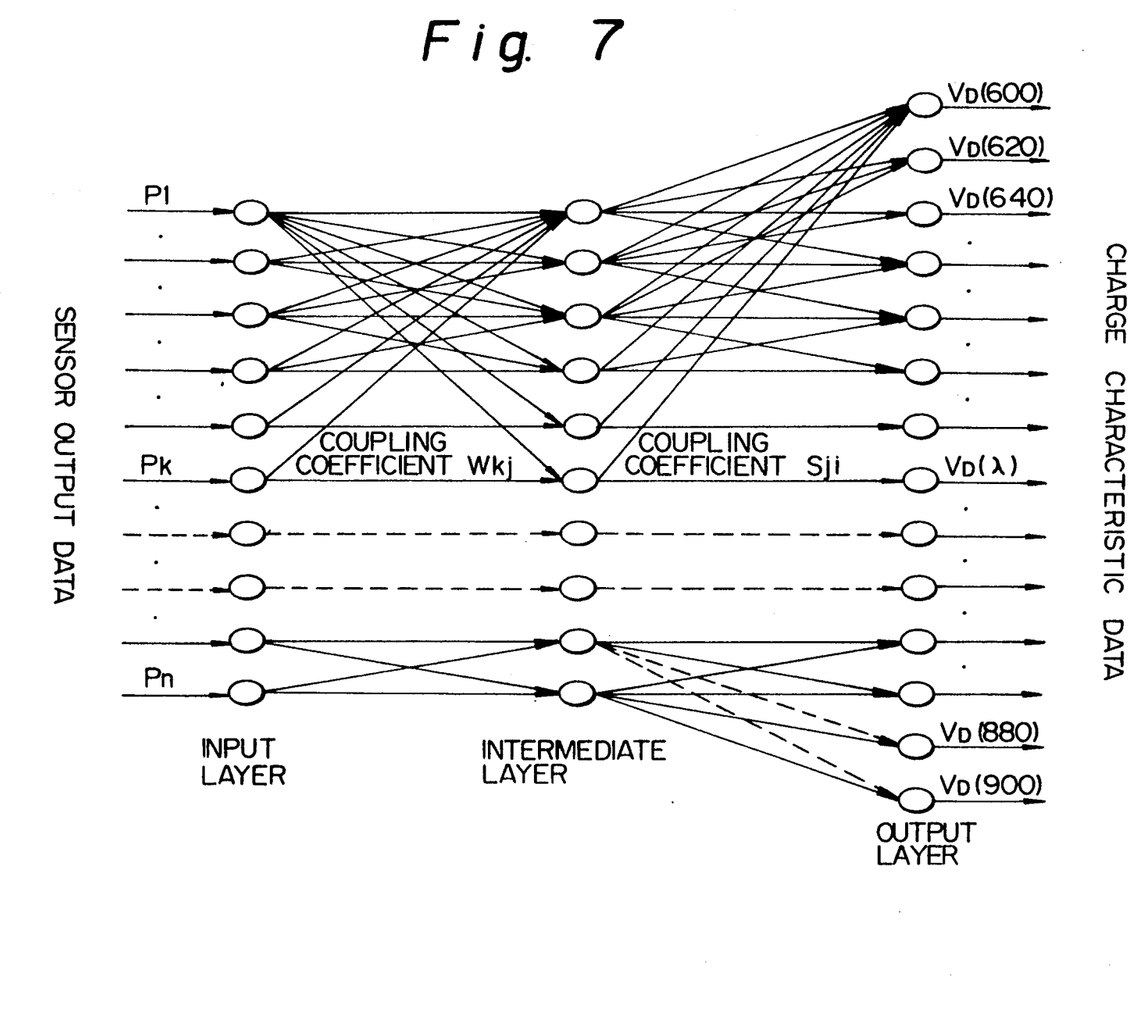
FIG. 7 shows a neural network also incorporated in the control device for determining a charge characteristic.

FIGS. 6 and 7 show respectively a trilayer neural network for determining a latent image gamma characteristic and a trilayer neural network for determining a charge characteristic. The sensor output data from the sensors 100 are applied to input layer of such neural networks.

The operation of the control device of the invention will be described with respect to the learning stage and the decision stage of each of the neural networks 501 and 601.

To begin with, the neural network 501 assigned to the latent image gamma characteristic learns in the configuration shown in FIG. 1, as follows. Among the outputs of the sensors 100, the parameters (sensor output data) relating to the conditions of the drum 1 are applied to the neural network 501. For the neural network 501 to obtain learning data, a gray scale pattern having tones corresponding in number to the outputs of the network 501 is formed on the drum 1. The surface potentials of the drum 1 associated one-to-one with the tones of the gray scale pattern are measured to determine a latent image gamma characteristic. The surface potentials of the image area are used as learning data. Specifically, assuming that the exposure manipulation value $\tau$ for the exposing section is implemented as 8-bit data, a gray scale pattern having 256 successive tones is used while the neural network 501 is provided with 256 outputs.

Then, the potential VL (τ) of the image area associated with the duration of exposure τ and resulted from each tone of the gray scale pattern is applied to corresponding one of the output ports as learning data. In the example shown in FIG. 6, the duration of exposure τ is 0 (μs) to 100 (μs) having an interval of 5 (μs) while the gray scale pattern is provided with twenty-one tones.

The other neural network 601 learns by the following procedure. Again, the sensor output data are applied to the neural network 601. To obtain learning data, while the grid voltage VG is sequentially changed, the variation in the surface potential of the drum 1 is actually measured by the electrometer 101. Specifically, the grid voltage VG is changed by tones equal in number to the outputs of the neural network 601. The resulting surface potentials VD (λ) each being associated with respective tone voltage VS=λ define a charge characteristic. In FIG. 7, the grid voltage λ ranges from 600 (V) to 900 (V) which are graduated on a 20 (V) basis, i.e., sixteen tones are used.

The neural networks 501 and 601 each effects decision in the configuration shown in FIG. 2. First, regarding the latent image gamma characteristic, as the sensor output data are fed from the sensors 100 to the neural network 501, it is possible to determine the instantaneous latent image gamma characteristic of the drum 1. In the example shown in FIG. 6, the potentials VL (τ) associated with the durations of exposure τ ranging from 0 (μs) to 100 (μs) are the outputs of the neural network 501. An amount of exposure is determined on the basis of the target potential of the image area, thereby controlling the actual amount of exposure.

Regarding the charge characteristic, as the sensor output data from the sensors 100 are fed to the neural network 601 in the configuration shown in FIG. 2, it is possible to determine the instantaneous charge characteristic of the drum 1. In the example shown in FIG. 7, the background potentials VD (λ) associated with the grid voltages λ ranging from 600 (V) to 900 (V) are the outputs of the neural network 601. A grid voltage is determined on the basis of the target potential of the background area, whereby the actual charge potential is controlled.

The conditions of various process units are represented by the outputs of the sensors 100 including a DC voltage, counter values, temperature and humidity. Some parameters relating to the conditions of the drum 1 are generated out of such sensor output data. Charge and exposure are controlled on the basis of such parameters and image data output from the scanner 200.

Examples of parameters having influence on the image density and methods of calculating them will be described.

The surface potential of the drum 1 which is a first parameter is determined by forming a predetermined latent image pattern on the drum 1 and then measuring the surface potentials of the resulting image area and white background of the drum 1. Here, stabilizing the surface potentials to target values is the object of latent image control. A second parameter is an amount of charge passed through the drum 1 and is determined by measuring a current fed from the charger 9 to the drum 1 by the ammeter 102 and then integrating the currents by the duration of use of the drum 1. Specifically, since the sensitivity of the drum 1 sequentially falls due to the long-term repetition of charging and discharging, the amount of charge passed through the drum 1 is represented by percentage to the usable limit (maximum rating) of the drum 1.

An amount of wear of the drum 1 which is a third parameter is substantially proportional to the total number of rotations of the drum 1. Specifically, the surface of the drum 1 is sequentially shaved off in contact with a cleaning section and a blade while in rotation, so that the electrostatic capacity of the drum 1 sequentially decreases. Therefore, the amount of wear of the drum 1 is determined in terms of the count of the rotation counter 103 and represented by percentage to the usable limit (maximum rating) of the drum 1. An amount of fatigue of the drum 1 which is a fourth parameter is substantially proportional to the total duration of exposure of the drum 1. Specifically, the sensitivity of the drum 1 also changes and decreases due to short-term repetition of exposure. Hence, the amount of fatigue is determined in terms of the count of the exposure duration counter 104 and represented by percentage to the usable limit (maximum rating) of the drum 1.

A degree of continuous use which is a fifth parameter shows how many copies have been produced in the past up to the present time by, for example, a copier. The degree of continuous use means a ratio of a short-term duration of use of, for example, a copier, and a duration of suspension. Further, as the drum 1 is continuously used, the sensitivity thereof falls and potentials undesirably remain thereon. In light of this, the degree of continuous use is determined in terms of the count of the copy counter 105. Temperature and humidity which are a sixth and a seventh parameter are represented by the outputs of temperature sensor 106 and humidity sensor 107, respectively. The sensitivity of the drum 1 is extremely susceptible to changes in temperature and humidity. While this is ascribable to changes in the electrostatic capacity of a photoconductor and leakage currents occurring during and after charging, it is difficult to grasp a direct relation in practice.

In summary, it will be seen that the present invention provides an electrophotographic process control device capable of effecting optimal control with respect to each of various definite factors which cause a photoconductive element to deteriorate. Such a control device, therefore, achieves a broad range of control and prevents equipment in which it is incorporated from running out of control. The control device is capable of controlling a charger and the amount of exposure on the basis of long-term and short-term deterioration factors without measuring surface potential data. Further, with the control device of the invention, it is possible to control a plurality of drum deterioration factors in a delicate way. In addition, the present invention reduces the amount of experiments which should be performed at the time of process design and development, thereby reducing the term and costs for development.

Various modifications will become possible for those skilled in the art after receiving the teachings of the present disclosure without departing from the scope thereof.

What is claimed is:

1. An electrophotographic process control device, comprising:
   a neural network having an input layer and an output layer;
   sensors disposed within and in peripheral portions of an electrophotographic process mechanism and including a surface electrometer, a drum ammeter, a drum rotation counter, an exposure duration counter, a copy counter, a temperature sensor and a humidity sensor;

wherein at a learning stage of said neural network, data from said sensors are applied to said input layer of said neural network, and a latent image gamma characteristic indicative of a relation between an amount of exposure and a potential of an image area and which is one of characteristics of a photoconductive drum to be used in an electrophotographic process is used as learning data to be given via said output layer of said neural network; and wherein at a control stage of said neural network, the data from said sensors are applied to said input layer of said neural network in the same manner as at said learning stage, and an amount of exposure is so controlled as to set up a desired potential in an image area on the basis of a latent image gamma characteristic obtained from said output layer.

2. An electrophotographic process control device, comprising:

a neural network having an input layer and an output layer;

sensors disposed within and in peripheral portions of an electrophotographic process mechanism and including a surface electrometer, a drum ammeter, a drum rotation counter, an exposure duration counter, a copy counter, a temperature sensor and a humidity sensor;

wherein at a learning stage of said neural network, data from said sensors are applied to said input layer of said neural network, and a charge characteristic indicative of a relation between a potential of a background and a charge grid potential and which is one of characteristics of a photoconductive drum to be used in an electrophotographic process is used as learning data to be given via said output layer of said neural network; and wherein at a control stage of said neural network, the data from said sensors are applied to said input layer of said neural network in the same manner as at said learning stage, and an amount of exposure is so controlled as to set up a desired potential in an image area on the basis of a charge characteristic obtained from said output layer.

3. An electrophotographic process control device, comprising:

a neural network having an input layer and an output layer;

sensors disposed within and in peripheral portions of an electrophotographic process mechanism and including a surface electrometer, a drum ammeter, a drum rotation counter, an exposure duration counter, a copy counter, a temperature sensor and a humidity sensor;

wherein at a learning stage of said neural network, data from said sensors are applied to said input layer of said neural network, and a latent image gamma characteristic indicative of a relation between an amount of exposure and a potential of an image area and which is one of characteristics of a photoconductive drum to be used in an electrophotographic process and a charge characteristic indicative of a relation between a potential of a background and a charge grid potential and which is another characteristic of said photoconductive drum are used as learning data to be given via said output layer of said neural network; and wherein at a control stage of said neural network, the data from said sensors are applied to said input layer of said neural network in the same manner as at said learning stage, and an amount of exposure is so controlled as to set up a desired potential in an image area on the basis of a latent image gamma characteristic and a charge characteristic obtained from said output layer.

* * * * *